P. H. GRACE.
Spark-Arresters.
No. 8,549. Reissued Jan. 21, 1879.
Fig. 1.
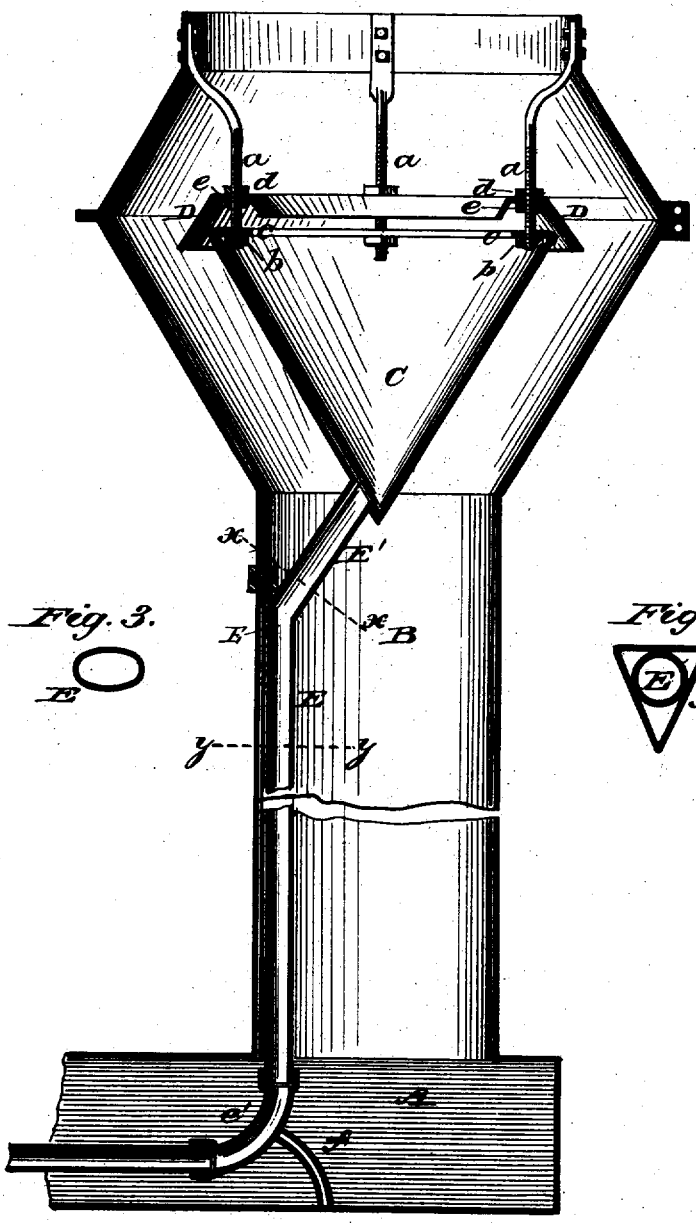
Fig. 3.
Fig 2.
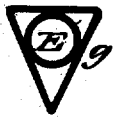
Witnesses.
Fred. G. Dieterich
George Binkenburg
Inventor
Patrick H. Grace
by Louis Bagger
his attorneys
N. PETERS, PHOTO-LITHOGRAPHER, WASHINGTON, D. C.

UNITED STATES PATENT OFFICE.

PATRICK H. GRACE, OF SEDALIA, MISSOURI.

IMPROVEMENT IN SPARK-ARRESTERS.

Specification forming part of Letters Patent No. 193,242, dated July 17, 1877; Reissue No. 8,549, dated January 21, 1879; application filed November 27, 1878.

*To all whom it may concern:*

Be it known that I, PATRICK H. GRACE, of Sedalia, in the county of Pettis and State of Missouri, have invented certain new and useful Improvements in Spark-Arresters; and I do hereby declare that the following is a full, clear, and exact description thereof, that will enable others skilled in the art to which they appertain to make and use the same, reference being had to the accompanying drawings, which form a part of this specification, and in which—

Figure 1 is a vertical section of my improved spark-arrester. Fig. 2 is a cross-section through the line *x x* of Fig. 1, and Fig. 3 is a similar section on the line *y y* of same figure.

Corresponding parts in the several figures are denoted by like letters.

This invention relates to certain improvements in spark-arresters, particularly adapted for the smoke-stacks of locomotives, steamboats, and portable or stationary engines; and it consists in an improved construction and combination of parts, having for its object to produce a spark-arrester that shall be absolutely certain and effectual in its operation, substantially as hereinafter more fully set forth.

In the drawings, A is the smoke-box, and B the stack, of a locomotive. (Represented in vertical section.)

Inserted and suspended in the bonnet (so called) of the stack is an inverted cone, C, suspended or hung therein some distance below its upper end by means of the hangers or rods or bolts *a a*, bolted or otherwise fastened to the inner rim or upper part of said end of stack, and provided with nuts *b*, fitting on screw-threads on said hangers and beneath the inwardly-projecting flange or rim *c*, it being perforated to permit of the passage through the same of the hangers.

Instead of the flange *c*, brackets may be fastened to the same end of cone to serve the same purpose as said flange.

Adjusted to the screw-threaded portions of the hangers *a a*, between jam-nuts *d d e e*, to permit of its vertical adjustment, is the deflector D, which is arranged directly above the outer rim of the cone C, with an intermediate space between them. The inner and outer rims or flanges of the deflector D, which is semi-hexagonal in cross-section, extend, the inner one beyond the upper edge or rim of the cone, while the outer flange or rim extends likewise beyond, but a considerable distance below, the said end of cone, to insure the intercepting of the rising sparks, &c., and pass the same into the cone to be carried off through the conveyer or pipe adapted for that purpose.

E is the spark conveyer or pipe, the upper bent end of which enters the cone or hopper C at its bottom. It is next passed downwardly along the inner side of the stack to the smoke-box A. It may extend no farther than this point, and thus drop its falling contents directly into the smoke-box, to permit of said contents or unconsumed matter being again carried up the stack until thoroughly consumed or converted into incombustible matter. It, however, may be passed to the fire-box or ash pan or pit by the aid of an elbow, *e'*, as seen in Fig. 1. A small pipe, *f*, is, in that case, passed from the exhaust-ports or steam-chests of the engine into the horizontal arm or elbow of the conveyer or pipe E, for the double purpose of drawing the sparks and dust from the cone into the pipe or conveyer, and blowing them through the elbow *e'* into the fire-box or ash-pan.

The upper bent portion of conveyer E (denoted by the letter E') rests in a triangular or other suitably-shaped jacket, *g*, as illustrated in Fig. 2, and the vertical portion passing down along the inside of the stack is oblong or oval in cross-section, as seen in Fig. 3, so as to afford or offer the least possible resistance to the draft, and lessening wear upon conveyer.

From the foregoing description the operation of my invention will be readily understood. The smoke, sparks, and exhaust-steam passing up through the stack meet the point of the cone C, causing them to diverge or spread and seek escape above.

The smoke and steam, having a natural tendency to spread, will partly escape through the outer flange or rim of the deflector and the sides of the stack, and partly over the upper edge or end of the cone, between it and the deflector, and up through the opening in the latter; but the sparks, whose impulse is in a straight or perpendicular line, will strike the deflector D, and will by it be thrown back into the cone, from which they are emptied through the pipe or conveyer, in the manner described.

By raising or lowering the deflector D, in the manner and by means above stated, the draft in the stack can be regulated at pleasure.

By constructing the annular deflector semi-hexagonal in its cross-section, as herein shown and described, instead of segmental or of ogee form in cross-section, I provide for the better adjustment of the jam-nuts *d d e e*, by means of which the elevation of the deflector above the rim of the spark-cone is regulated. These nuts having flat faces, as usual, are, by this semi-hexagonal construction of the deflector, enabled to bear on both sides of this against flat and not curved surfaces, the raised middle section of the deflector forming a flat annulus with downwardly-slanting sides, which said flat part is clamped firmly between the nuts.

Having thus fully described my invention, I claim and desire to secure by Letters Patent of the United States—

1. As an improvement in spark-arresters, the screw-threaded hangers *a a*, provided each with three sets of nuts, *b e d*, for the independent adjustment of and in combination with the spark cone and deflector, substantially as and for the purpose herein shown and described.

2. In a spark-arrester, the combination, with the screw-threaded hangers *a a*, having jam-nuts *e d*, of the annular deflector D, semi-hexagonal in cross-section, substantially as and for the purpose herein shown and described.

3. The combination of the stack B, having vertical hangers *a*, with the inverted cone C, conveyer E′ E, and adjustable deflector D, substantially as and for the purpose herein shown and described.

In testimony that I claim the foregoing I have hereunto set my hand.

PATRICK H. GRACE.

Witnesses:

JAMES S. ROGERS,

JAMES R. DUNLAP.